June 15, 1971  L. J. HRUSOVSKY  3,585,086
LEAF SPRING ELEMENTS HAVING HIGH FATIGUE AND WEAR
RESISTANCE AND METHOD OF PRODUCING THE SAME
Filed June 26, 1968  2 Sheets-Sheet 1

S.A.E. 1046

United States Patent Office 3,585,086
Patented June 15, 1971

3,585,086
LEAF SPRING ELEMENTS HAVING HIGH
FATIGUE AND WEAR RESISTANCE AND
METHOD OF PRODUCING THE SAME
Louis J. Hrusovsky, Bloomfield Hills, Mich., assignor to
North American Rockwell Corporation, Pittsburgh, Pa.
Filed June 26, 1968, Ser. No. 740,268
Int. Cl. C21d 9/02
U.S. Cl. 148—145                                    12 Claims

ABSTRACT OF THE DISCLOSURE

A leaf spring element made of carbon steel having a high degree of fatigue and wear resistance, the spring element being heat treated such that it has a relatively thin surface layer, or rim, of high hardness and relatively high residual compressive stresses. These physical characteristics are provided by quenching the spring element and then tempering it at a temperature selected from within a range of approximately 300° F. to 500° F., the tempering temperature preferably being held for a relatively long period of time.

BACKGROUND OF THE INVENTION

(A) Field of the invention

This invention relates to leaf springs for vehicles and, more particularly, to left spring elements formed of inexpensive carbon steel and characterized by both improved wear resistance and improved fatigue life.

(B) Description of the prior art

Leaf springs for vehicles are comprised of one or more elongated leaf spring elements interconnecting relatively movable portions of the vehicle. Typically, the center of the leaf spring is connected to an axle and the ends are connected to the vehicle chassis or body. By flexing under the impact of dynamic loads, the leaf spring absorbs a large amount of energy and thus isolates the vehicle body and its passengers or contents from the large and severe jolts experienced by the axle. Since the spring elements are thus subject during normal operation to large and cyclic loads, their fatigue life is an extremely critical characteristic. Similarly, because of the sliding contact due to spring articulation, which occurs between the spring elements and their supports, particularly at their ends, severe wear can occur at the points of contact. It is, therefore, desirable that the spring elements be formed of a material which has both an extremely high fatigue life under heavy and cyclic bending loads and a high degree of resistance to wear resulting from sliding contact.

To attain these twin objectives, the usual practice, and the most satisfactory approach prior to the present invention, has been to make the springs of a high grade alloy steel such as S.A.E. 4161. In the manufacture of leaf spring elements from S.A.E. 4161 and similar alloy steels, the usual practice is to roll the element to proper size from bar stock, heat it to its austenitizing temperature, quench it in oil, and then temper it. The resulting spring element has a substantially uniform hardness throughout. As an example, a spring element made of S.A.E. 4161 and tempered at 900° F. exhibited a uniform hardness of 46 Rockwell C and a fatigue life of 18,000 cycles under bending loads in the stress range of 30,000 to 150,000 p.s.i. With respect to size and shape, the specimen element had a uniform width of three inches and was taper rolled to a total length of 49 inches, the element having a center thickness of 1.40 inches. The support points were located 4.50 inches from the ends of the element, the thickness at the support points being 0.70 inch. By shot peening the tension surface of a similar spring element after tempering, a common practice in the manufacture of such springs, the fatigue life was increased to 136,000 cycles. While this general approach is the most satisfactory known heretofore, it is less than ideal. First of all, springs made in this manner are quite expensive due primarily to the high initial cost of high grade alloy steels. Secondly, although spring elements made in this manner exhibit the best combination of wear resistance and fatigue life obtainable prior to the present invention, the actual values obtained are still substantially lower than would be preferred by the spring designer.

Various efforts have, of course been made to provide leaf spring elements of low cost materials having high fatigue life and wear resistance, these materials including carbon steels having carbon contents of approximately 0.40 to 0.60 percent. S.A.E. 1046 steel is a typical example of these carbon steels, S.A.E. 1046 having the following composition:

Carbon—0.43–0.50
Manganese—0.70–1.00
Phos—0.04 max.
Sulfur—0.05 max.
Silicon—0.15–0.60
Iron—Remainder These efforts to utilize low-cost materials have included many approaches, including tempering, quenching without tempering, shot peening, etc. The results have been less than completely satisfactory. As an example of these prior art methods, a spring element of S.A.E. 1046 having the same physical dimensions as the elements of S.A.E. 4161 described above was quenched in water containing 10 percent sodium hydroxide and then tested. This spring element failed the first time it was loaded, its fatigue life thus being zero cycles. This spring element was essentially made in accordance with the shaft forming method taught by U.S. Pat. No. 2,599,575, entitled "Shaft," and issued on June 10, 1952 to M. B. Morgan. According to Morgan, "shafts which are subjected substantially only to torsional stress" perform better when made of carbon steel by his non-tempering process than they do if made of the best alloy steel. It will be appreciated from the above example, however that Morgan's approach to the problem of torsionally loaded shafts is not applicable to the problem of leaf springs subject to large, transversely applied bending loads. Similarly, as indicated in the patent to Morgan tempered shafts of carbon steel have been utilized with some success in the past for transmitting torsional loads. It has been thought heretofore that such an approach is entirely inappropriate for use in manufacturing leaf springs subject to bending loads rather than to torsional loads. To illustrate the reason for this view by those skilled in the art, a spring element of S.A.E. 1046 was quenched in water containing 10 percent sodium hydroxide and then tempered at a commonly accepted temperature of 550° F. The resulting fatigue life was only 39,000 cycles.

SUMMARY OF THE INVENTION

It is, therefore, an object of this invention to provide low cost leaf springs having acceptable fatigue life and wear resistance.

Another object of this invention is to provide an improved leaf spring having greater wear resistance and longer fatigue life than heretofore obtainable with any material and process.

Briefly stated, in carrying out the invention in one form, a leaf spring element manufactured of a low cost carbon steel is heat treated such that it has a relatively thin surface layer, or rim, having high hardness and relatively high residual compressive stresses for good wear resistance and long fatigue life. This physical construction and the resulting characteristics are provided by quenching the spring element and then tempering it at a temperature selected from within the approximate range of 300° F. to 500° F. By a further aspect of the invention, the formed spring element is heated to a temperature at which austenite is formed, quenched in a caustic solution, preferably water containing 10 percent sodium hydroxide, to transform the austenite to martensite, and finally tempered at a temperature within the specified range. By a still further aspect of the invention, the spring element is maintained at the tempering temperature for a relatively long period of time, preferably for at least one hour and substantially longer for spring elements intended for use under severe conditions.

BRIEF DESCRIPTION OF THE DRAWING

While this specification concludes with claims particularly pointing out and distinctly claiming the subject matter forming the invention, the invention, together with further objects and advantages, may best be understood by reference to the following description taken in conjunction with the accompanying drawing, in which:

DESCRIPTION OF THE PREFERRED EMBODIMENT

Figure 1:
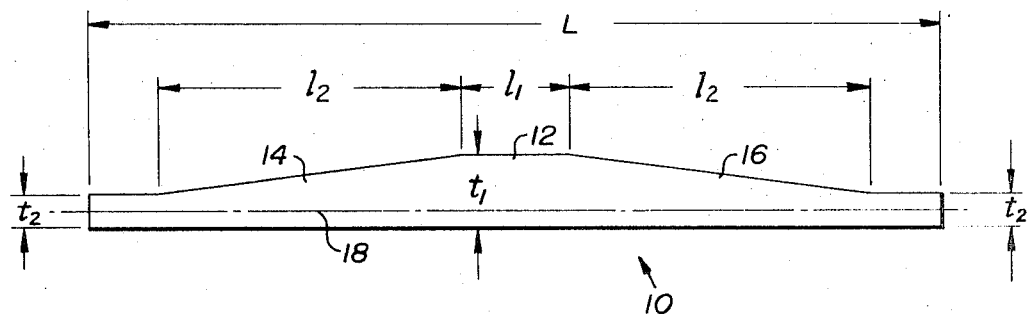
FIG. 1 is a side elevation of a leaf spring element formed in accordance with the present invention.
Figure 2:
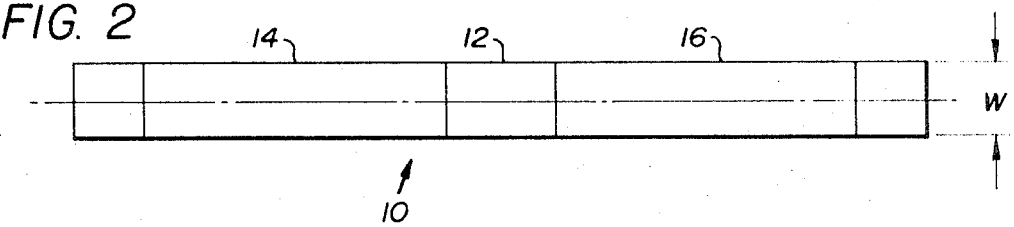
FIG. 2 is a plan view of the spring element of FIG. 1.

Referring first to FIGS. 1 and 2, a leaf spring element 10 formed in accordance with the present invention is illustrated. The leaf spring element 10 may be used by itself as a single leaf spring in a vehicle or similar equipment, or it may be combined with similar elements in a multileaf spring assembly. While the particular spring element 10 is of the taper type described and claimed in U.S. Pat. No. 3,145,984, entitled "Single Taper Leaf Spring," issued to W. A. Hallam on Aug. 25, 1964 and assigned to the assignee of this application, it will be appreciated that the unique heat treating process described and claimed in this application is equally applicable to spring elements having constant rather than varying cross-sectional areas along their longitudinal axes. It is, of course, essential to the practice of the present invention that the spring elements be formed of a carbon steel, such as S.A.E. 1046, which has a carbon content of substantially 0.40 to 0.60 percent.

Turning attention now to the particular spring element 10 of FIGS. 1 and 2, it has an overall length L of 49.0 inches and a constant width W of 3.0 inches. The spring element 10 includes a center portion 12 which has a length $l_1$ of 6.0 inches and has a uniform thickness $t_1$ of 1.40 inches and tapered end portions 14 and 16 which have lengths $l_2$ and $l_3$ between the center portion 12 and support points 8 and 9 of 17.0 inches. The thickness of the spring element 10 at the support points 8 and 9 is 0.70 inch. It will be obvious that the dimensions of FIGS. 1 and 2 are distorted in order to better illustrate the tapered configuration. The spring element 10 is uncambered, i.e., it is straight rather than preformed into an arched configurtion. As this description proceeds, however, it should be recognized that the invention is equally applicable to cambered as well as to straight spring elements. Similarly, it should be recognized that the present invention can be applied to spring elements having dimensions varying greatly from those of the elements 10. The dimensions given are, however, of importance with respect to evaluating test results since the measured fatigue life under a specified load range is related to the size of the springs. Accordingly, it will be understood that all test results reported in this specification were obtained by testing specimens having these dimensions.

In initially forming the spring element 10, a blank of suitable size is cut from a bar of carbon steel, such as S.A.E. 1046 steel, the blank then being ground to remove decarburization, surface imperfections, scale and oxide to provide a smooth exterior surface. The ground blank is then hot rolled to produce the tapered configuration of FIGS. 1 and 2 along its longitudinal axis 18. More particularly, the tapered form illustrated may best be provided by means of the method and apparatus disclosed in either U.S. Pat. No. 3,145,591, entitled "Leaf Spring Tapering Apparatus," issued Aug. 25, 1964 to F. R. Krause, or U.S. Pat. No. 3,233,444, entitled "Taper Roll Machine and Method," issued Feb. 8, 1966 to R. H. Groves et al., both assigned to the assignee of this application. Attention is directed to these patents for a full understanding of the taper forming process. After the tapered configuration of FIGS. 1 and 2 is produced, the spring element is trimmed to final size. At this point, the spring element 10 has its final physical dimensions, but it does not have the unique structure and properties provided by the present invention. These are provided by the heat treating process which will now be described.

As indicated above, leaf spring elements have been commonly made in the past of high grade alloy steels such as S.A.E. 4161. A typical spring element made of S.A.E. 4161 and tempered at 900° F. has been found to have a fatigue life of about 18,000 cycles under bending loads in the stress range of 30,000 to 150,000 p.s.i. This fatigue life is plotted on FIG. 3 as horizontal line A. By shot peening the tension surface of the spring element after it is tempered, the fatigue life can be increased to about 136,000 cycles as illustrated by horizontal line B. Since, however, it is desirable that the fatigue life be at least several hundred thousand cycles, this approach is not altogether satisfactory from a performance viewpoint. In addition, leaf springs made of high grade alloy steels are quite expensive. Efforts have been made in the past to manufacture leaf springs of lower cost materials such as carbon steel. By quenching leaf spring elements made of S.A.E. 1046 and then using the elements without further treatment, as would be suggested by the aforesaid Pat. No. 2,599,575, a totally unacceptable fatigue life of zero cycles is obtained. By subsequently tempering the leaf spring of S.A.E. 1046 at a commonly accepted tempering temperature, 550° F., a fatigue life of only 39,000 cycles is obtained as illustrated by the vertical line at 550° F. Since these fatigue life values fall far below line B, it will be obvious that these approaches do not provide desirable alternatives to conventional leaf springs made of alloy steels and subsequently shot peened.

In accordance with the present invention, however, it has been found that leaf spring elements 10 made of carbon steel exhibit exceptional and completely unexpected fatigue life properties when heat treated in a certain manner, including tempering at a temperature within the approximate range of 300° F. to 500° F. In accordance with the present invention, the formed spring element 10 is heated to a temperature within the range of 1450° F. to 1750° F. and is held at that temperature until the steel is fully transformed into the form of austenite. After the steel is transformed to the austenite form, it is rapidly quenched in a caustic solution to convert the austenite into martensite. Martensite is a very hard form of steel which forms upon rapid quenching and provides exceptionally good wear characteristics. In the actual practice of the invention, the transformation to martensite is essentially complete at and just below the surface of the leaf spring, this region being extremely hard. In the interior of the spring element where hardness is not as critical, the percentage of martensite and the corresponding hardness falls off substantially.

This quenching procedure in a caustic solution, which is preferably water containing 10 percent sodium hydroxide, also results in very substantial residual compressive stresses in the outer layer of the leaf spring. It is believed that these residual compressive stresses contribute substantially to the extremely long life characteristics of springs formed in accordance with the present invention.

Figure 3:
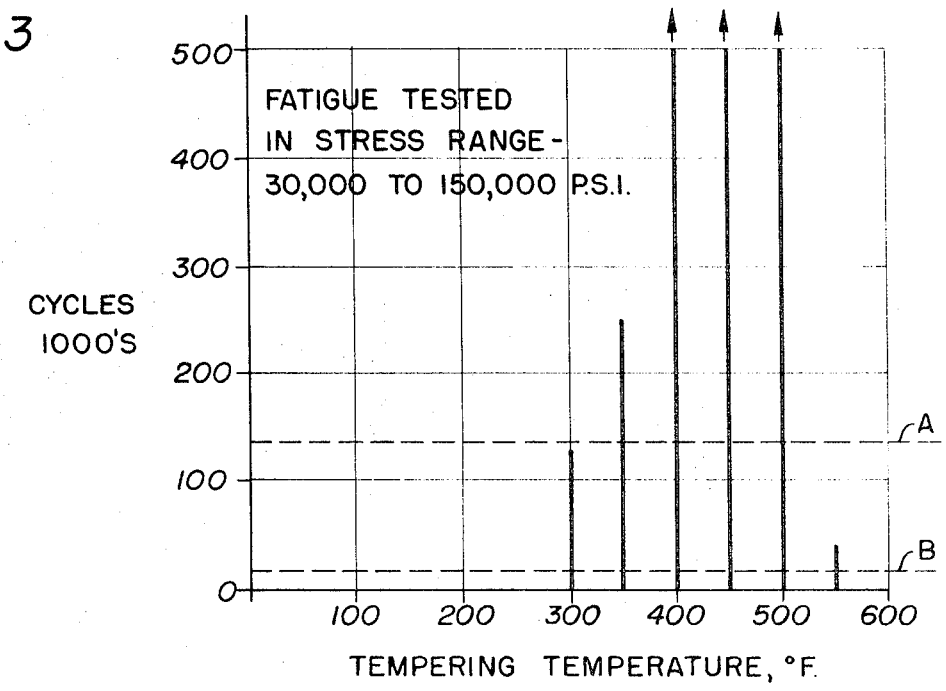
FIG. 3 is a chart comparing the fatigue lives of spring elements formed in accordance with the present invention and prior art methods.

Turning attention to FIG. 3, a leaf spring element 10 tempered at 400° F. for a period of 2.50 hours has been found to exhibit a fatigue life of at least 500,000 cycles, the test being stopped at that point without failure. These results have been obtained at various tempering temperatures from a low temperature of 400° F. to a high temperature of 500° F. Outside of this range, fatigue life falls with decreasing tempering temperatures below 400° F. and increasing tempering temperatures above 500° F. Nevertheless, the fatigue life of leaf spring elements made of S.A.E. 1046 and tempered throughout the range of 300° F. to 500° F. has been found to exceed or at least favorably compare with that of more expensive spring elements made of shot peened S.A.E. 4161. The reason for this unusual and unexpected performance of carbon steel is not fully understood at the present time, but it is believed that tempering within this range for relatively long periods of time, one to four hours or more, results in a highly favorable thermal diffusion of elements within the spring. This performance of carbon steel is all the more unexpected when compared with high alloy steel treated in the same manner. For example, a spring made of S.A.E. 1046 and tempered within the specified range failed after only 300 cycles.

Figure 4:
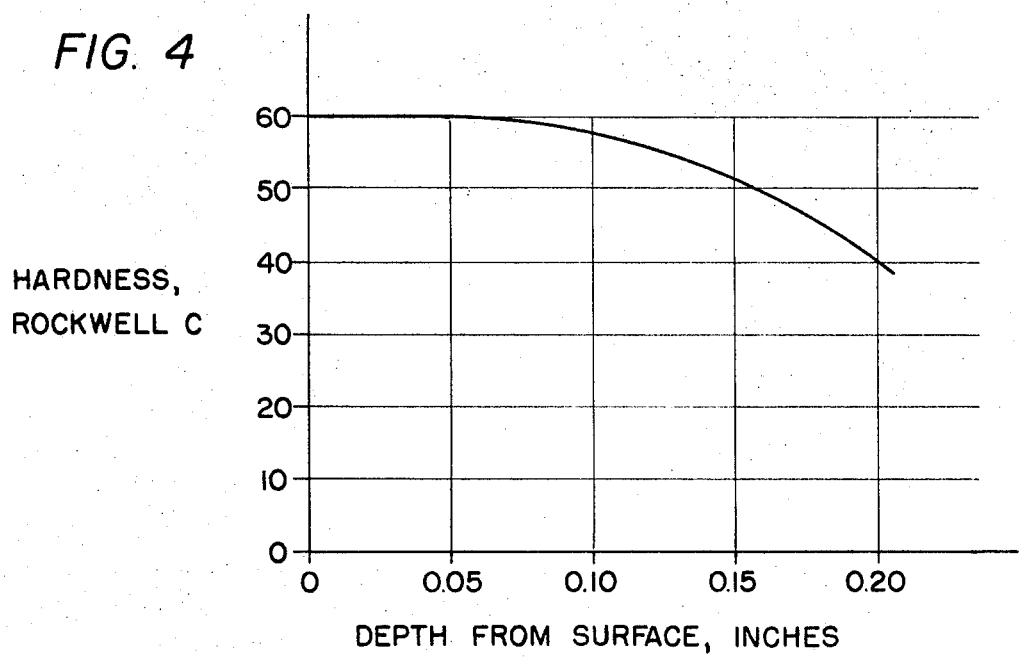
FIG. 4 is a chart illustrating the hardness distribution in the rim layer of the spring element of FIGS. 1 and 2.

To this point, the discussion of the present invention has centered largely upon the enhanced fatigue life. Actually, leaf spring elements made of E.A.E. 1046 and heat treated in accordance with the invention have a hardened substantially above that of conventional springs made of alloy steel. This means, of course, that the spring elements also have enhanced surface wear resistance. For example, the specimen springs made of S.A.E. 4161 have been found to have a hardness throughout of essentially 46 Rockwell C. On the other hand, spring elements made of S.A.E. 1046 and tempered within the specified range have surface hardnesses of at least 55 Rockwell C. A typical hardness distribution in the thin outer layer of a spring element made of S.A.E. 1046 in accordance with the invention is illustrated by FIG. 4. This figure shows how the distribution of martensite and hardness drops off in the interior of the spring element beneath the surface layer, which in this case had a thickness of approximately 0.250 inch. The optimum thickness of this surface layer is such that the highest stress existing at the inner boundary of the layer is about equal to the fatigue limit of the material, the fatigue limit being the stress below which the material can endure an infinite number of stress cycles. The "highest stress" is, of course, the algebraic sum of the residual stress created by hardening and the highest applied load stress. This optimum thickness can be controlled by varying the amounts of the constituents and thereby varying the hardenability of the carbon steel.

Figure 5:
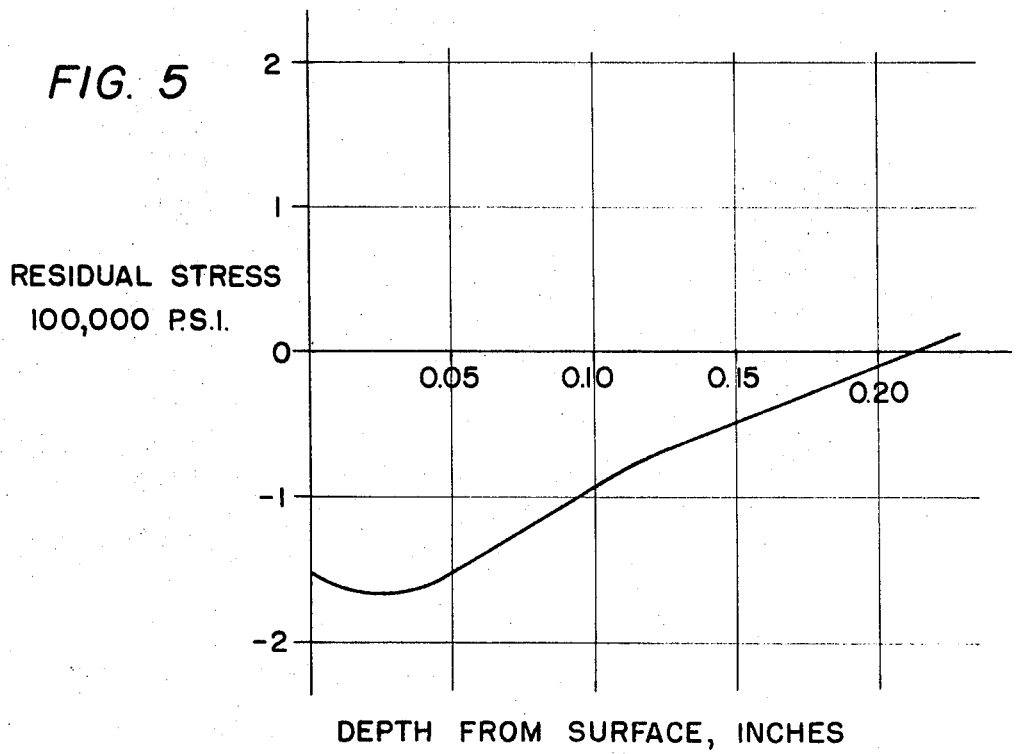
FIG. 5 is a chart illustrating the residual stress distribution in the rim layer of the spring element of FIGS. 1 and 2.

FIG. 5 illustrates the desired residual compressive stress distribution in the thin outer layer of a typical spring element of S.A.E. 1046 heat treated in accordance with the present invention. While these residual stresses are desirable for long life, it will be appreciated that they should not be so large that plastic yielding occurs on the compression side of the spring element during use. If the expected compressive stresses resulting from loading and the residual stresses exceed the compressive yield point, the compression side of the spring element may be induction tempered to relieve the residual stresses to an appropriate level.

Leaf spring elements formed in accordance with the present invention also exhibit enhanced vibration damping characteristics due to their non-homogeneous character. Unlike conventional springs made of alloys having uniform physical properties throughout, springs made in accordance with the present invention have a composite structure having hard outer layers and a soft core of viseo-elastic properties. This laminated structure has the ability to absorb vibrational energy through shear damping, converting the vibrational energy into heat.

From the foregoing, it will be appreciated that the invention provides low cost leaf springs having greater wear resistance and longer fatigue life than heretofore obtainable with any material or process.

It will be understood that various changes and modifications may be made without departing from the spirit and scope of the invention, and it is intended to cover all such changes and modifications by the appended claims.

What is claimed as new and is desired to secure by Letters Patent is:

1. A leaf spring element having varying thickness and formed from tempered steel having from .40 to .60 percent carbon, said spring element characterized by a thin surface layer of high hardness for good wear resistance and an interior of generally lower hardness, and said spring element further characterized by an extremely long fatigue life when subjected to transversely applied bending loads, the surface hardness of said thin surface layer being tempered to at least 55 Rockwell C.

2. A leaf spring element as defined in claim 1 in which said surface layer has substantially uniform hardness and the interior hardness gradually decreases from said surface layer to the centerline portion, the thickness of said surface layer being such that the fatigue limit is approximately equal to the highest stress at the inner boundary of the surface layer.

3. A leaf spring element as defined by claim 1 in which said surface layer has substantially uniform hardness and the interior hardness gradually decreases from said surface layer to the centerline portion, the thickness of said surface layer being approximately 0.250 inch.

4. A leaf spring element as defined by claim 1 in which said surface layer has high residual compressive stresses therein on at least one side of said spring element for providing extended fatigue life.

5. A leaf spring element as defined by claim 4 in which said spring element is tapered along its longitudinal centerline, said surface layer having a substantially uniform thickness and said interior having a varying thickness along said longitudinal centerline.

6. A leaf spring element as defined by claim 5 in which the said surface layer has a thickness of approximately 0.250 inch.

7. A method of heat treating elongated leaf spring elements for use in vehicles, said method comprising:
heating a spring element formed of steel having a carbon content of from .40 to .60 percent to a temperature at which the carbon steel is in the form of austenite, quenching said spring element to convert at least the surface layer of said spring element to martensite, and tempering said spring element at a temperature within the approximate range of 300° F. to 500° F., whereby the heat treated spring element of carbon steel has high surface hardness and residual compressive stresses for wear resistance and long fatigue life.

8. The method defined by claim 7 for heat treating leaf spring elements in which said spring element is quenched in a caustic solution.

9. The method defined in claim 7 for heat treating leaf spring elements in which said spring element is quenched in water containing approximately 10 percent sodium hydroxide.

10. The method defined by claim 7 for heat treating leaf spring elements in which said spring element is maintained at the tempering temperature for an extended period of time.

11. The method defined by claim 10 for heat treating leaf spring elements in which said extended period of time is at least one hour.

12. The method defined by claim 11 for heat treating leaf spring elements in which said spring element is quenched in a caustic solution.

References Cited
UNITED STATES PATENTS

| | | | |
|---|---|---|---|
| 2,599,575 | 6/1952 | Morgan | 148—39 |
| 2,843,374 | 7/1958 | Boegehold | 148—39 |

RICHARD O. DEAN, Primary Examiner

U.S. Cl. X.R.

148—18, 36, 39, 146, 152; 267—47

PO-1050
(5/69)

UNITED STATES PATENT OFFICE
CERTIFICATE OF CORRECTION

Patent No. 3,585,086                          Dated June 15, 1971

Inventor(s) LOUIS J. HRUSOVSKY

It is certified that error appears in the above-identified patent and that said Letters Patent are hereby corrected as shown below:

Column 1, line 29, change "left" to -- leaf --;

Column 3, lines 68 and 69, change "configurtion" to -- configuration --;

Column 5, line 34, change "1046" to -- 4161 --;

line 34, cancel "within the specified range" and substitute therefor -- at 450° F. for three hours --;

line 38, change "E.A.E." to -- S. A.E. --;

line 40, change "hardened" to -- hardness --.

Signed and sealed this 26th day of October 1971.

(SEAL)
Attest:

EDWARD M. FLETCHER, JR.        ROBERT GOTTSCHALK
Attesting Officer                Acting Commissioner of Patents